(12) United States Patent
Khan

(10) Patent No.: US 8,965,422 B2
(45) Date of Patent: Feb. 24, 2015

(54) TAGGING INSTANT MESSAGE CONTENT FOR RETRIEVAL USING MOBILE COMMUNICATION DEVICES

(75) Inventor: Tabarak Khan, Hoffman Estates, IL (US)

(73) Assignee: BlackBerry Limited, Waterloo (CA)

( * ) Notice: Subject to any disclaimer, the term of this patent is extended or adjusted under 35 U.S.C. 154(b) by 234 days.

(21) Appl. No.: 13/403,104

(22) Filed: Feb. 23, 2012

(65) Prior Publication Data

US 2013/0225212 A1    Aug. 29, 2013

(51) Int. Cl.
    *H04W 4/00* (2009.01)
(52) U.S. Cl.
    USPC .......... 455/466; 701/522; 455/414.3
(58) Field of Classification Search
    CPC ............ H04W 4/12; H04W 4/14; H04W 4/18
    USPC ............. 455/414.3, 466, 417, 556.1, 435.1
    See application file for complete search history.

(56) References Cited

U.S. PATENT DOCUMENTS

| | | | |
|---|---|---|---|
| 5,506,951 | A | 4/1996 | Ishikawa |
| 5,787,295 | A | 7/1998 | Nakao |
| 6,356,287 | B1 | 3/2002 | Ruberry et al. |
| 7,502,831 | B1 * | 3/2009 | Macias et al. ............. 709/206 |
| 7,594,187 | B2 | 9/2009 | Baird et al. |
| 7,596,596 | B2 * | 9/2009 | Chen et al. ............. 709/204 |
| 7,859,539 | B2 | 12/2010 | Beckman |
| 2006/0009243 | A1 | 1/2006 | Dahan et al. |
| 2008/0109406 | A1 | 5/2008 | Krishnasamy |
| 2008/0189331 | A1 * | 8/2008 | Lee et al. .................. 707/104.1 |
| 2009/0150397 | A1 | 6/2009 | Chen et al. |
| 2009/0158213 | A1 * | 6/2009 | Ryu .............................. 715/825 |
| 2010/0011317 | A1 | 1/2010 | Lee |
| 2011/0082906 | A1 | 4/2011 | Kreig et al. |
| 2013/0218987 | A1 * | 8/2013 | Chudge et al. ............... 709/206 |

FOREIGN PATENT DOCUMENTS

WO    2011085248    7/2011

OTHER PUBLICATIONS

Extended European Search report mailed Jul. 24, 2012, in corresponding patent application No. 12156730.9.

(Continued)

*Primary Examiner* — Kiet Doan
(74) *Attorney, Agent, or Firm* — Novak Druce Connolly Bove + Quigg LLP

(57) ABSTRACT

Methods and devices are provided for marking content in substantially real-time messaging applications using a mobile communication device. A marking application in cooperation with a messaging application displays a message communication on a graphical user interface of the mobile communication device, enables navigation to a selected position within the message communication and receives a signal to mark the selected position with a tag. A manually actuated signal is provided to mark the selected position within the message communication and receive an automatically actuated signal to mark a portion of the message communication based on a pre-defined rule. Receiving the manually actuated signal includes receiving one of: a first actuation signal from a user-selected key on a keyboard or a second actuation signal from a user-selected icon on the graphical user interface. The mobile communication device allows users to more efficiently tag and retrieve content transmitted in substantially real-time.

14 Claims, 7 Drawing Sheets

(56) References Cited

OTHER PUBLICATIONS

Twitter Help Center—Frequently asked questions; http://support.twitter.com/entries/13920-frequently-asked-questions.; downloaded Jun. 14, 2011.

Twitter Help Center—What is a Timeline? http://support.twitter.com/groups/31-twitter-basics/topics/109-tweets-messages/articles/164083-what-is-a-timeline, downloaded Jun. 14, 2011.

Office Action mailed Aug. 7, 2014; in corresponding Canadian patent application No. 2,805,786.

\* cited by examiner

TAGGING INSTANT MESSAGE CONTENT FOR RETRIEVAL USING MOBILE COMMUNICATION DEVICES

FIELD OF THE DISCLOSURE

The disclosure relates generally to mobile communication devices, and more particularly, to tagging and retrieving message content using mobile communication devices.

BACKGROUND

Existing mobile communication devices allow users to communicate using instant messaging applications. In order to refer back to or re-review particular portions of the instant message content, users generally need to physically scroll back and forth along the instant message content. Scrolling on a communication device typically involves repeated manipulations of a navigation tool. Conventional scrolling operations are often time-consuming and inefficient. What is needed is a mobile communication device that enables locating message content using more efficient techniques.

DETAILED DESCRIPTION

The disclosure provides a method of enabling efficient tagging and retrieval of near real-time message content, including instant message content, short message service (SMS) content, multimedia messaging service (MMS) content, and the like. In one example, the method comprises a marking application which enables automatic and manual tagging of near real-time message content. Once tagged, the marking application allows users to efficiently navigate to desired message content associated with the tags. The marking application may operate with real-time chat applications, including instant message applications, such as BLACK-BERRY® Messenger, APPLE® iMessage, FACEBOOK™ Messenger, SAMSUNG® ChatOn, or the like; SMS applications; and MMS applications; among other near real-time chat applications. While the below examples are generally directed to instant message applications, the technology is not limited to instant message applications.

Users of the mobile communication devices may manually tag content while communicating with third parties during near real-time chat sessions, such instant message sessions. For example, while interacting with a graphical user interface (GUI), users may perform tagging operations, including in substantially real-time, by manipulating a keyboard, a navigation tool, or a voice-command receiving tool, or the like. To this end, users may manually tag selected portions of the instant message content by navigating to desired positions within the message content and, for example, actuating one or more keys of the keyboard on the mobile communication device. According to one example, users may manually tag a character, a word, a sentence, a digital image, or other data elements within the message content. Once tagged, users subsequently may actuate a data entry device to navigate to the desired message content associated with the tag. Data entry devices may include a keyboard, a navigation tool, a voice-command receiving tool, or the like. In one example, actuating the data entry device includes actuating one or more keys of the keyboard.

The marking application additionally may perform automatic tagging operations according to pre-defined or user-defined rules for tagging desired instant message content. For example, the marking application may be programmed to automatically tag instant message content based on pre-selected message characteristics, such as a sender's name, a sender's company name, a message creation time, a message arrival time, a message creation date, and a message arrival date, among other pre-selected message characteristics. The pre-defined or user-defined rules may further associate the automatically generated tag with, for example, one or more keys on keyboard of the mobile communication device. Once tagged, users may actuate a data entry device to navigate to the desired message content associated with the tag.

Figure 1:
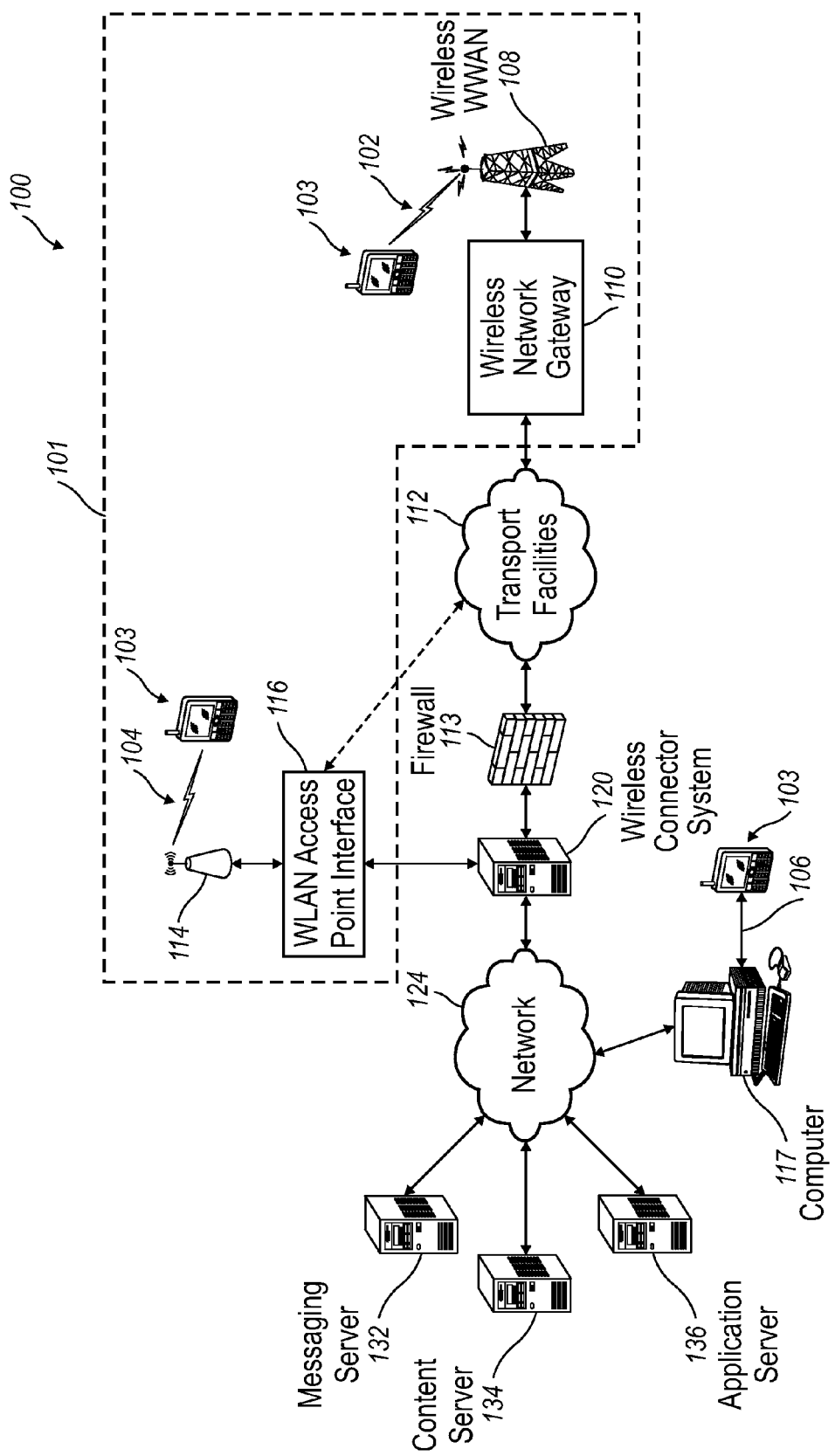
FIG. 1 is a communication system for mobile communication devices according to one example.

FIG. 1 illustrates an example of an operating environment for a communication system 100 that may include a number of mobile communication devices 103. The communication system 100 may support the mobile communication devices 103 in any of several different ways. The mobile communication devices 103 may be coupled to a wireless network 101, such as one or more of a Wireless Wide Area Network (WWAN) 102 and a Wireless Local Area Network (WLAN) 104, among other suitable network arrangements. In some examples, the mobile communication devices 103 may be configured to communicate over both the WWAN 102 and WLAN 104, and to roam between these networks. In some examples, the wireless network 101 may comprise multiple WWANs 102 and WLANs 104, among other configurations.

The WWAN 102 may be implemented as any suitable wireless access network technology. By way of example, but not limitation, the WWAN 102 may be implemented as a wireless network that includes a number of transceiver base stations 108 (one of which is shown in FIG. 1), where each of the base stations 108 provide wireless Radio Frequency (RF) coverage to a corresponding area or cell. The WWAN 102 typically is operated by a mobile network service provider that provides subscription packages to users of the mobile communication devices 103. In some examples, the WWAN 102 may conform to one or more of the following wireless network types: Mobitex Radio Network; DataTAC; GSM (Global System for Mobile Communication); GPRS (General Packet Radio System); TDMA (Time Division Multiple Access); CDMA (Code Division Multiple Access); CDPD (Cellular Digital Packet Data); iDEN (integrated Digital Enhanced Network); Ev-DO (Evolution-Data Optimized); CDMA2000; EDGE (Enhanced Data rates for GSM Evolution); UMTS (Universal Mobile Telecommunication Systems); HSPDA (High-Speed Downlink Packet Access); IEEE 802.16e (also referred to as Worldwide Interoperability for Microwave Access or "WiMAX"), or various other networks. While WWAN 102 is described herein as a "Wide-Area" network, that term is intended also to incorporate wireless Metropolitan Area Networks (WMAN) or other similar technologies for providing coordinated service wirelessly over an area larger than that covered by typical WLANs.

The WWAN 102 may communicate with a wireless network gateway 110 that couples the mobile communication devices 103 to transport facilities 112. The transport facilities 112 couple the mobile communication devices 103 to a wireless connector system 120. The transport facilities 112 may include one or more private networks or lines, the Internet, a virtual private network, or any other suitable network, among other transport facilities. The wireless connector system 120 may be operated, for example, by an organization or enterprise such as a corporation, university, or governmental department, among other organizations or enterprises, which allow access to a network 124, such as an internal or enterprise network (e.g., an intranet) and its resources. Alternatively, the wireless connector system 120 may be operated by a mobile network provider. In some examples, the network 124 may be realized using the Internet rather than, or in addition to, an internal or enterprise network.

The wireless network gateway 110 provides an interface between the wireless connector system 120 and the WWAN 102. The wireless network gateway 110 facilitates communication between the mobile communication devices 103 and other devices (not shown) that may be connected, directly or indirectly, to the WWAN 102. Accordingly, communications sent via the mobile communication devices 103 are transported via the WWAN 102, the wireless network gateway 110 and the transport facilities 112 to the wireless connector system 120. Communications sent from the wireless connector system 120 are received by the wireless network gateway 110 and transported via the WWAN 102 to the mobile communication devices 103.

According to one example, the WLAN 104 includes a wireless network that conforms to IEEE 802.11x standards (sometimes referred to as WI-FI®) such as, for example, the IEEE 802.11a, 802.11b and/or 802.11g standard. One of ordinary skill in the art will readily appreciate that other communication protocols may be used for the WLAN 104, such as, IEEE 802.11n, IEEE 802.16e (also referred to as Worldwide Interoperability for Microwave Access or "WiMAX"), or IEEE 802.20 (also referred to as Mobile Wireless Broadband Access), among other communication protocols. The WLAN 104 includes one or more wireless RF Access Points (AP) 114 (one of which is shown in FIG. 1) that collectively provide a WLAN coverage area.

The WLAN 104 may be a user's personal network, an enterprise network, or a hotspot offered by an Internet service provider (ISP), a mobile network provider, or a property owner in a public or semi-public area, for example. The access points 114 may be connected to an access point (AP) interface 116 that may connect to the wireless connector system 120 directly or indirectly. A direct connection may be provided when the access point 114 is part of an enterprise WLAN 104 in which the wireless connector system 120 resides. An indirect connection may be provided via the transport facilities 112, as indicated by the dashed signal line in FIG. 1, if the access point 114 is a personal WI-FI® network or WI-FI® hotspot. In this case, a mechanism, such as a virtual private network (VPN), may be used for securely connecting to the wireless connector system 120. The AP interface 116 may provide translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services such as a messaging server 132, for example, a MICROSOFT EXCHANGE SERVER®, IBM LOTUS DOMINO®, or NOVELL GROUPWISE™ email server; a content server 134 for providing content, such as Internet content or content from an organization's internal servers; application servers 136 for implementing server-based applications, such as instant messaging (IM) applications to mobile communication devices 103, and intranet file services; among other connected resources and services.

The wireless connector system 120 typically provides a secure exchange of data (e.g., email messages, personal information manager (PIM) data, and IM data) with the mobile communication devices 103. In some examples, communications between the wireless connector system 120 and the mobile communication devices 103 may be encrypted. In some examples, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some examples, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as a messaging server 132 or a content server 134 or an application server 136, or a combination of these. Conversely, the wireless connector system 120 may send data packets received, for example, from the messaging server 132, the content servers 134, the application servers 136 or any combination of these, to the wireless network gateway 110 that then transmits the data packets to the destination mobile communication device 103. The AP interfaces 116 of the WLAN 104 provide similar sending functions between the mobile communication device 103, the wireless connector system 120 and network connection point, such as the messaging server 132, the content server 134, the application server 136, or any combination of these.

The network 124 may comprise a private local area network (LAN), metropolitan area network (MAN), wide area network (WAN), the public Internet or combinations thereof.

The network 124 may include virtual networks constructed using any of these networks, alone or in combination. Alternatively, the mobile communication device 103 may connect to the wireless connector system 120 using a computer 117, such as a desktop or a notebook computer, via the network 124. A link 106 may be provided between the mobile communication device 103 and the computer 117 for exchanging information between the mobile communication device 103 and a computer 117 connected to the wireless connector system 120. The link 106 may include one or both of a physical interface or a short-range wireless communication interface.

The physical interface may comprise one or a combination of an Ethernet connection, a Universal Serial Bus (USB) connection, a FIREWIRE™ (also known as an IEEE 1394 interface) connection, or other serial data connections, via respective ports or interfaces of the mobile communication device 103 and the computer 117. The short-range wireless communication interface may be a personal area network (PAN) interface. A PAN is a wireless point-to-point connection implemented without physical cables to connect the two end points. The short-range wireless communication interface may include one or a combination of an infrared (IR) connection, such as an Infrared Data Association (IrDA) connection, a short-range radio frequency (RF) connection, such as one specified by IEEE 802.15.1 or the BLUETOOTH special interest group, or IEEE 802.15.3a, also referred to as UltraWideband (UWB), or other PAN connection.

It will be appreciated that the above-described communication system 100 is provided for illustration purposes only. The above-described communication system 100 may be implemented using any of a multitude of network configurations for use with the mobile communication devices 103. Suitable variations of the communication system 100 will be readily appreciated by a person of ordinary skill in the art and are intended to fall within the scope of the present disclosure.

Figure 2:
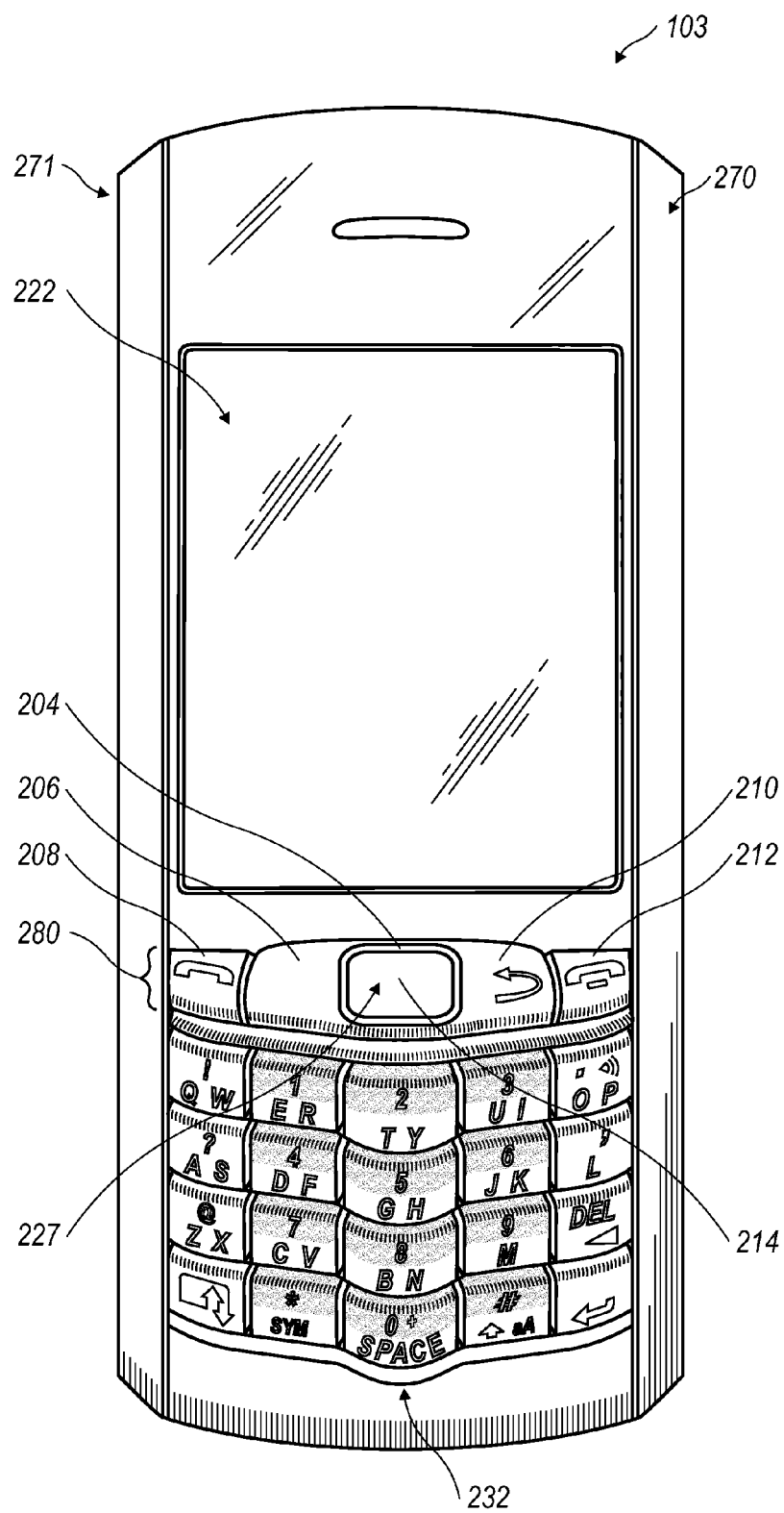
FIG. 2 is a mobile communication device according to one example.

FIG. 2 illustrates an example mobile communication device 103 having a display 222, which presents a user interface (not shown), positioned above a user input device, such as a keyboard 232 or other suitable device for accommodating textual input to the mobile communication device 103. In accordance with an aspect of the disclosure, the mobile communication device 103 may comprise a front face 270 having a navigation row 280. The navigation row 280 may include a call send key 208, a menu key 206, an escape key 210 and a call end key 212, and the like. As shown, the mobile communication device 103 may include a "uni-body" structure, also known to those skilled in the art as a "candy-bar" design.

The mobile communication device 103 may include an optional auxiliary input device 227 that acts as a cursor navigation tool. The auxiliary input device 227 may be exteriorly located upon the front face 270 of the mobile communication device 103. The auxiliary input device 227 includes a tracking window 214 that may be provided within a decorative ring 204. The location of auxiliary input device 227 on the front face 270 allows the cursor navigation tool to be thumb-actuable, e.g., like the keys of the keyboard 232. Some examples provide the auxiliary input device 227 in the form of an optical navigation tool that may be utilized to instruct two-dimensional screen cursor movement in substantially any direction. The auxiliary input device 227 may act as an actuator when the cursor navigation tool is depressed like a button. Other examples may provide the auxiliary input device 227 in the form of a track pad, a touchpad, a trackball, a pointing stick, a joystick, or a graphics tablet, among other auxiliary input devices. The auxiliary input device 227 may be placed above the keyboard 232 and below the user interface 222. In this location, the auxiliary input device 227 may avoid interference during keyboarding and does not block the operator's view of the user interface or display screen 222 during use.

The mobile communication device 103 may be configured to send and receive instant message communication content, including text messages, image files, music files, video images, voice note files, media files, email messages, telephone communication information, voice mail files, telephone call logs, address book entries, calendar entries, task list entries, word processing documents, mobile application content and browser content, among other instant message communication content. According to one example, the mobile communication device 103 includes a body 271 that may be configured to be held in one hand during operation of the mobile communication device 103. The user interface is displayed on the front face 270 of the body 271 to provide information during device operation. The mobile communication device 103 also may be configured to send and receive voice communications, such as mobile telephone calls. The mobile communication device 103 may include a camera (not shown) to enable capture of digital content, such as photographs.

Figure 3:
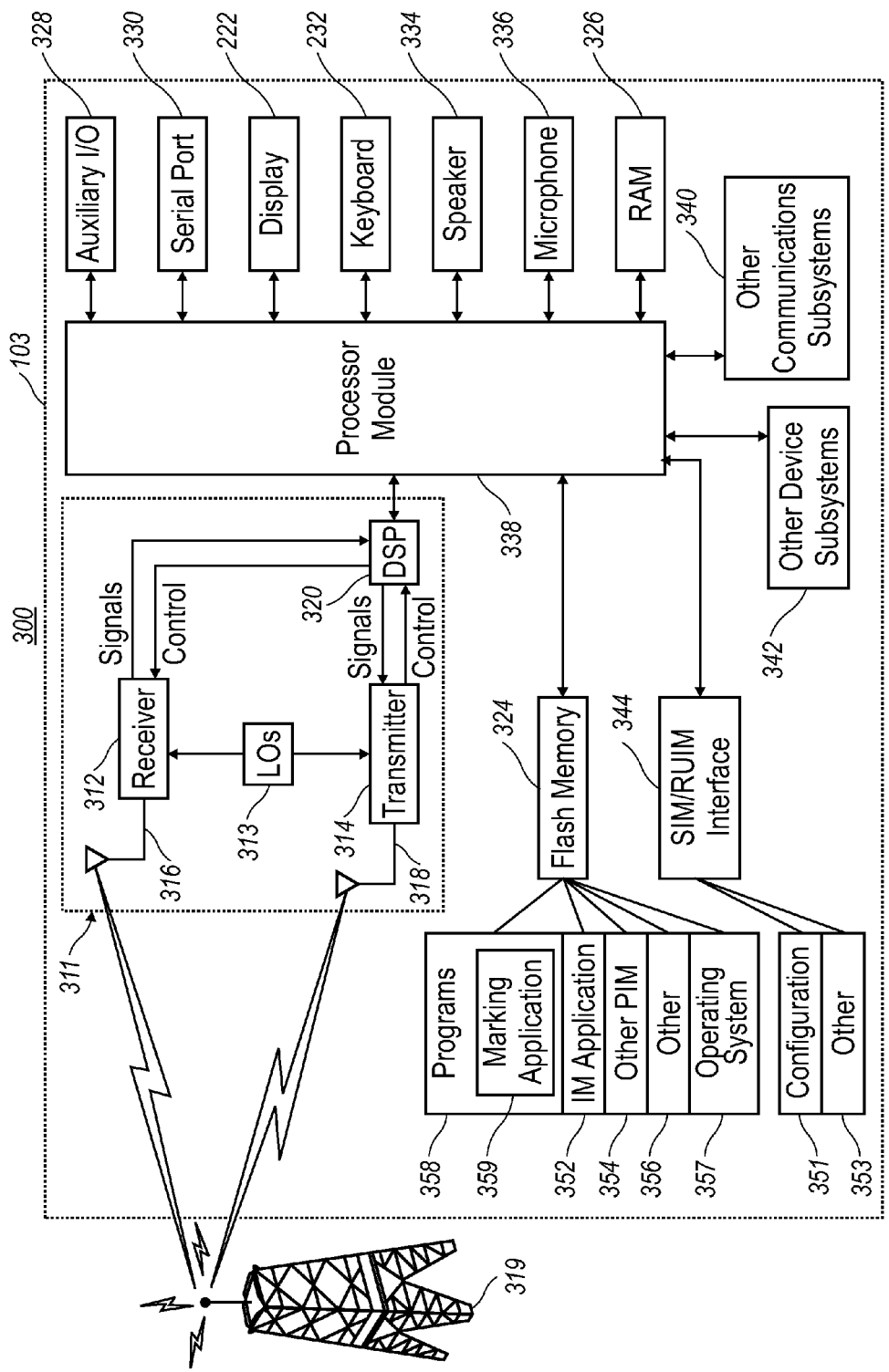
FIG. 3 is a block diagram of the mobile communication device illustrated in FIG. 2 operating in a communication environment according to one example.

FIG. 3 illustrates a block diagram 300 of the mobile communication device 103 in accordance with an example. The mobile communication device 103 includes a microprocessor 338 that controls operations of the mobile communication device 103. A communication subsystem 311 is provided that performs communications, including transmission and reception of data via the wireless network 319. The microprocessor 338 may be communicatively coupled to an auxiliary input/output (I/O) subsystem 328 of the mobile communication device 103. In at least one example, the microprocessor 338 may be communicatively coupled to a serial port 330, such as a Universal Serial Bus port, which enables communications with other devices or systems. The display 222 may be communicatively coupled to the microprocessor 338 for displaying the GUI on the mobile communication device 103. When the mobile communication device 103 is equipped with a keyboard 232, the keyboard 232 also may be communicatively coupled with the microprocessor 338. The mobile communication device 103 may include a speaker 334, a microphone 336, a random access memory (RAM) 326, and a flash memory 324, among other components. These components may be communicatively coupled to the microprocessor 338. Other components may be provided on the mobile communication device 103 and these other components may be optionally communicatively coupled to the microprocessor 338. Other communication subsystems 340 and other communication device subsystems 342 are generally indicated as being functionally connected with the microprocessor 338 as well.

An example of a communication subsystem 340 includes a short range communication system, such as a BLUETOOTH® communication module or a WI-FI® communication module, such as a communication module in compliance with IEEE 802.11b, and associated circuits and components. Additionally, the microprocessor 338 may be configured to perform operating system functions that enable execution of programs on the mobile communication device 103. In some examples, less than all of the above components may be included in the mobile communication device 103. For example, the keyboard 232 may not be provided as a separate component, but instead may be integrated with a touch screen as described below.

The auxiliary I/O subsystem 328 may take the form of a variety of different navigation tools, including multi-directional or single-directional navigation tools. The navigation tools may include an optical navigation tool, a trackball navigation tool, a thumbwheel, a navigation pad, a joystick or a touch-sensitive interface, among other I/O interfaces. According to one example, the navigation tool may include the optical navigation tool illustrated in FIG. 2. These navigation tools may be located on the front surface of the mobile communication device 103 or may be located on any exterior surface of the mobile communication device 103.

Other auxiliary I/O subsystems may include external display devices and externally connected keyboards (not shown). While the above examples have been provided in relation to the auxiliary I/O subsystem 328, other subsystems capable of providing input or receiving output from the mobile communication device 103 are considered within the scope of this disclosure. Additionally, other keys may be placed along the side of the mobile communication device 103 to function as escape keys, volume control keys, scrolling keys, power switches, or user programmable keys, and may likewise be programmed accordingly.

The keyboard 232 may include a plurality of keys that are physical in nature, such as actuable buttons. Alternatively, the keyboard 232 may be implemented as a virtual keyboard with software instructions provided to represent physical keys (referred to herein as "virtual keys") on the display 222. It is also contemplated that user input may be provided as a combination of these two types of keys. Each key of the plurality of keys may be associated with at least one action, which may be the input of a character, a command or a function, among other actions. In this context, "characters" are contemplated to include, for example, alphabetic letters, language symbols, numbers, punctuation, insignias, icons, pictures, or blank space, among other characters.

In the case of virtual keys, the indicia for the respective keys may be shown on the user interface of the display screen 222. According to one example, the virtual keys may be enabled by touching the display screen 222. A stylus, finger, or other pointer may be used to generate the character or activate the indicated command or function. Some examples of display screens 222 that are capable of detecting touch include resistive, capacitive, projected capacitive, infrared and surface acoustic wave (SAW) touch screens.

Physical and virtual keys may be combined in many different ways, as appreciated by those skilled in the art. In one example, the physical and virtual keys may be combined, such that the plurality of enabled keys for a particular program or feature of the mobile communication device 103 are shown on the display 222 in the same configuration as the physical keys. Using this configuration, the operator may select the appropriate physical key corresponding to what is shown on the display 222. Thus, the desired character, command or function is obtained by depressing the physical key corresponding to the character, command or function displayed at a corresponding position on the display 222, rather than touching the display 222.

Furthermore, the mobile communication device 103 may be equipped with components that enable operation of various programs. A flash memory 324 may be provided to store an operating system 357, device programs 358, and data. The device programs 358 may include a marking application 359, which is described further below. The operating system 357 is generally configured to manage the programs 358. The programs 358 may be stored in the flash memory 324 and may be executed on the microprocessor 338. The operating system 357 honors requests for services made by the programs 358 through predefined program interfaces, among other request types. More specifically, the operating system 357 typically determines the order in which the multiple programs 358 are executed on the microprocessor 338. The operating system 357 also determines an execution time allotted to each program 358, manages sharing of the flash memory 324 among the multiple programs, and handles input and output to and from other device subsystems 342, among performing other operations.

Additionally, operators may interact directly with the operating system 357 through the GUI. Interactions may be facilitated by input devices, including the keyboard 232 and the display screen 222. While an example of the operating system 357 may be stored in the flash memory 324, the operating system 357 in other examples may be stored in a read-only memory (ROM) or similar storage element (not shown). As those skilled in the art will appreciate, the operating system 357 and device program 358 (or parts thereof) may be loaded in a RAM 326 or other volatile memory. The flash memory 324 may be configured to support communication between the marking application 359 and a plurality of programs, including an instant messaging (IM) application 352, and a personal information manager (PIM) 354, among other programs. Additionally, the flash memory 324 may be configured to segregate communication between the programs 358 and other information 356.

When the mobile communication device 103 is enabled for two-way communication within the wireless communication network 319, signals may be sent and received from a mobile communication service. Examples of communication systems enabled for two-way communication include, but are not limited to, General Packet Radio Service (GPRS) networks; Universal Mobile Telecommunication Service (UMTS) networks; Enhanced Data for Global Evolution (EDGE) networks; Code Division Multiple Access (CDMA) networks; High-Speed Packet Access (HSPA) networks; Universal Mobile Telecommunication Service Time Division Duplexing (UMTS-TDD) networks; Ultra Mobile Broadband (UMB) networks; Worldwide Interoperability for Microwave Access (WiMAX) networks, or other networks that can be used for combined data and voice capabilities or separate data and voice capabilities.

For the communication systems listed above, the mobile communication device 103 may use a unique identifier to enable the mobile communication device 103 to transmit and receive signals from the communication network 319. Other systems may not use such identifying information. For example, GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different mobile communication devices 103. The mobile communication device 103 may be able to operate some features without a RUIM or SIM card, but may not be able to communicate with the network 319. A SIM/RUIM interface 344 may be located within the mobile communication device 103 to allow for removal or insertion of the RUIM and SIM card (not shown). The RUIM and SIM card may include a memory that holds key configurations 351 and other information 353, such as identification and subscriber-related information. With a properly enabled mobile communication device 103, two-way communication may be performed between the mobile communication device 103 and the communication network 319.

If the mobile communication device 103 is enabled as described above, or the communication network 319 includes such enablement, the two-way communication enabled mobile communication device 103 may be configured to both transmit and receive multi-media content and other data from the communication network 319. The communication transfer may be performed to or from the mobile communication device 103. In order to communicate with the communication network 319, the mobile communication device 103 may be equipped with an integral or internal antenna 318 that transmits signals to the communication network 319. Likewise, the mobile communication device 103 may be equipped with an additional antenna 316 for receiving communication from the communication network 319. According to one example, these antennae 316, 318 may be combined into a single antenna (not shown). As one skilled in the art will appreciate, the antenna or antennae 316, 318 may be externally mounted on the mobile communication device 103 in another example.

When equipped for two-way communication, the mobile communication device 103 may include the communication subsystem 311 that supports the operational needs of the mobile communication device 103. The communication subsystem 311 may include a transmitter 314 and a receiver 312 including an associated antenna or antennae 316, 318 as described above, local oscillators (LOs) 313, and a processing module that in the presently described example is a digital signal processor (DSP) 320.

It is contemplated that communication between the mobile communication device 103 and the wireless network 319 may be any type of communication that both the wireless network 319 and mobile communication device 103 are enabled to support. In general, these communications may be classified as voice and data communications. Voice communication generally refers to communication in which signals for audible sounds are transmitted through the communication network 319 by the mobile communication device 103. Data communication generally refers to all other types of communication that the mobile communication device 103 is capable of performing within the constraints of the wireless network 319.

FIGS. 1, 2 and 3 are examples only and those persons skilled in the art will appreciate that additional elements and modifications may be necessary to make the mobile communication device 103 operate in particular network environments. The illustrated examples disclose the mobile communication devices 103 as smart phones. Alternative examples contemplate that the communication devices 103 may include personal digital assistants (PDA), tablet computers, laptop computers, or other communication devices capable of sending and receiving electronic messages. According to one example, the mobile communication devices 103 and the corresponding mobile communication device 300 structure may be characterized by an identification number that is assigned to the mobile communication device 103. According to one example, the identification numbers cannot be changed and are locked to each device.

The mobile communication devices 103 may include, or be modified to include, the marking application 359 to enable client-side manual tagging and automatic tagging of message content using the mobile communication devices 103. Alternatively, the marking application 359 may reside on one or more servers 132, 134, 136 to enable server-side manual tagging and automatic tagging of message content. The marking application 359 may operate in a background mode to enable tagging and retrieval of message content using the corresponding mobile communication devices 103. For example, the marking application 359 may operate in the background to enable tagging and retrieval of instant message content reviewed using messaging applications that operate in foreground. According to one example, the marking application 359 may operate with user awareness and may be accessible on demand for creating user-defined rules, including rules for tagging desired positions within the message content. Alternatively, the marking application 359 may operate undetected by users of the mobile communication devices 103 and the tagging and retrieval functionalities may appear integral with existing messaging applications.

According to one example, the mobile communication device 103 includes an instant message application, such as BLACKBERRY® Messenger, that enables users to engage in instant message communications with third parties. The marking application 359 operates concurrently with the instant message application to enable manual tagging and automatic tagging of content using the mobile communication devices 103. As discussed below, the tagged content may be quickly located or retrieved using a hotkey, for example.

During conventional operation of the instant messaging application to exchange instant message content with one or more third parties, users may desire to manually tag or bookmark portions of the instant message content for subsequent retrieval. For example, a user may receive or send a riddle during the instant message communication and the user may desire to tag the riddle for subsequent retrieval. With the marking application 359 operating in the background, the user may navigate within the instant message application to the riddle content by manipulating at least one of the keyboard, the navigation tool, the voice-command receiving tool, or the like. The user, for example, may manually position a cursor or other pointer on the GUI at a position proximate to the riddle content.

According to one example, the user may actuate a user-selected key on the keyboard, such as an "r" for riddle, to tag or bookmark the position of the riddle content while the cursor or pointer is positioned on the GUI proximate to the riddle content. The user-selected key, also called a hotkey, may be actuated for a pre-determined amount of time in order to associate or embed a tag at the desired position of the instant message content with the user-selected key. For example, the user may press and hold the "r" key for predetermined amount of time, such as 2 seconds, to tag the desired position of the instant message content with the user-selected "r" key. One of ordinary skill will appreciate that the desired hotkey may be actuated and held for a time greater or less than 2 seconds; alternatively, other techniques may be used to tag the desired position of the instant message content with the user-selected key. Once the user-selected key is associated with the desired position of the instant message content, the user may subsequently actuate the "r" key from any position within the instant message session to jump to or navigate to the riddle content.

According to one example, in order to identify a position, the marking application 359 may assign a session identification number to the instant message session, an entry identification number to each entry within the instant message session and an index number to each character within each entry. The instant messaging application and the marking application 359 may include a data structure, such as a table, that stores the position information. If a user desires to create a tag for the riddle content having a position that corresponds to the fiftieth (50) character of the tenth (10) entry within the second (2) instant message session, then the marking application 359 may store the position information and associate the desired tag with the user-selected key and the selected position. One of ordinary skill will appreciate that other techniques may be used to identify a position within the instant message session so that the position may be associated with a tag.

According to another example, the user may access interactive tools, such as a menu, to tag the position of the riddle content while the cursor or pointer is positioned proximate to the riddle content. The menu may be generated by the instant messaging application. Alternatively, the menu may be generated by the marking application 359 and may be presented within the GUI of the selected instant messaging application while the user is communicating using the instant messaging application. A menu icon may be presented on the GUI for selection to access menu features. Alternatively, menu features may be presented on the GUI upon actuation of a pre-selected key on the keyboard, manipulation of the navigation tool in a pre-selected way. Additionally, menu features may be enabled upon reciting a pre-selected voice-command, or the like.

The instant messaging application and the marking application 359 may store, in the data structure or the like, the programmed hotkeys in addition to identifying the associated content and the sender of the associated content, among other information. The marking application 359 may access and display the stored information on demand. In this way, the user may access up-to-date data regarding available hotkeys and assigned hotkeys associated with instant message content. According to one example, if a user attempts to overwrite an assigned hotkey, a message is presented on the GUI alerting the user that the hotkey is assigned and will be overwritten. The marking application 359 further may open an auxiliary window to display the content associated with the selected hotkey. If the user elects to proceed with the assigned hotkey, the user may elect to: (1) overwrite the assigned hotkey with new data or (2) associate additional positions and content with the assigned hotkey so that the assigned hotkey corresponds to the plurality of positions and content. If the user elects not to proceed with the assigned hotkey, a list of available hotkeys may be provided for selection.

According to another example, the marking application 359 provides automated tagging of message content on the mobile communication devices 103 for subsequent retrieval. For example, the marking application 359 may tag message content based on one or more characters in a sender's name, a message creation time, a message arrival time, a message creation date, and a message arrival date. Regarding tagging based on a sender's name, if three senders participate in an instant messaging session and have names that begin with characters A, B and C, the marking application 359 automatically tags message entries originating from each of these senders with corresponding letters A, B and C. One of ordinary skill will appreciate that if two or more senders share a name having a same first character or if the first character was previously assigned, the marking application 359 may employ a second character of the sender's name. Alternatively, the marking application 359 may employ more than one character to identify a sender's name.

Once tagged, a user may actuate characters A, B and C on a keyboard of the mobile communication devices 103 to step through session entries sent by corresponding ones of senders A, B and C. The marking application 359 may sequentially or randomly step through the session entries. Accordingly, if sender A contributes four session entries to an instant messaging session, a user may actuate character A on a keyboard to step through the four session entries provided by sender A. Similarly, if sender B contributes six session entries to an instant messaging session, a user may actuate character B on a keyboard to step through the six session entries provided by sender B. Furthermore, if sender C contributes five session entries to an instant messaging session, a user may actuate character C on a keyboard to step through the five session entries provided by sender C. One of ordinary skill will appreciate that additional message characteristics may be employed to tag instant message content.

The marking application 359 may be configured to inventory messaging applications that are supported by the mobile communication device 103. If a selected messaging application on the mobile communication device 103 is determined not to support desired message content, the marking application 359 may direct users to online resources that enable the mobile communication device 103 to process the message content. For example, the marking application 359 may direct users to application resources, such as an application store, which allow users to download applications supporting the message content.

Figure 4:
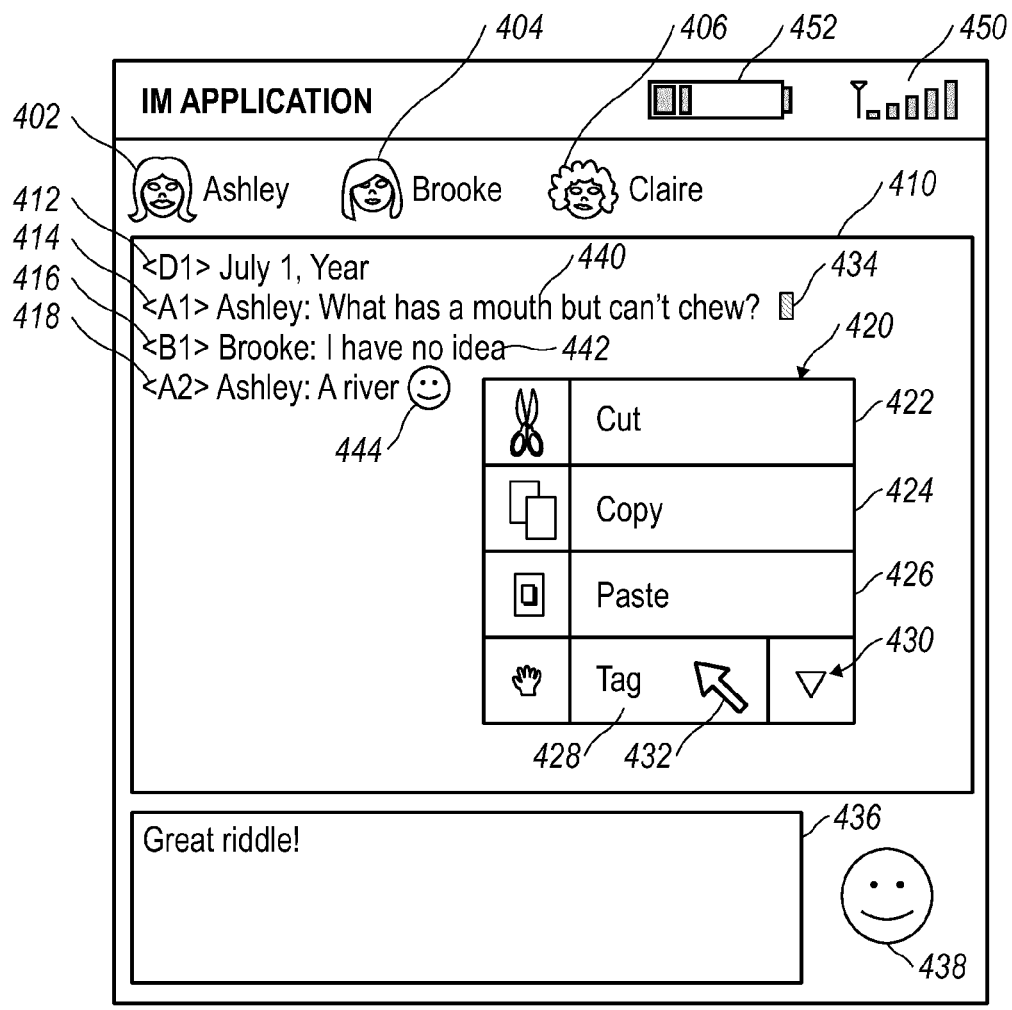
FIG. 4 is a visual representation of an instant messaging application according to one example.
Figure 5:
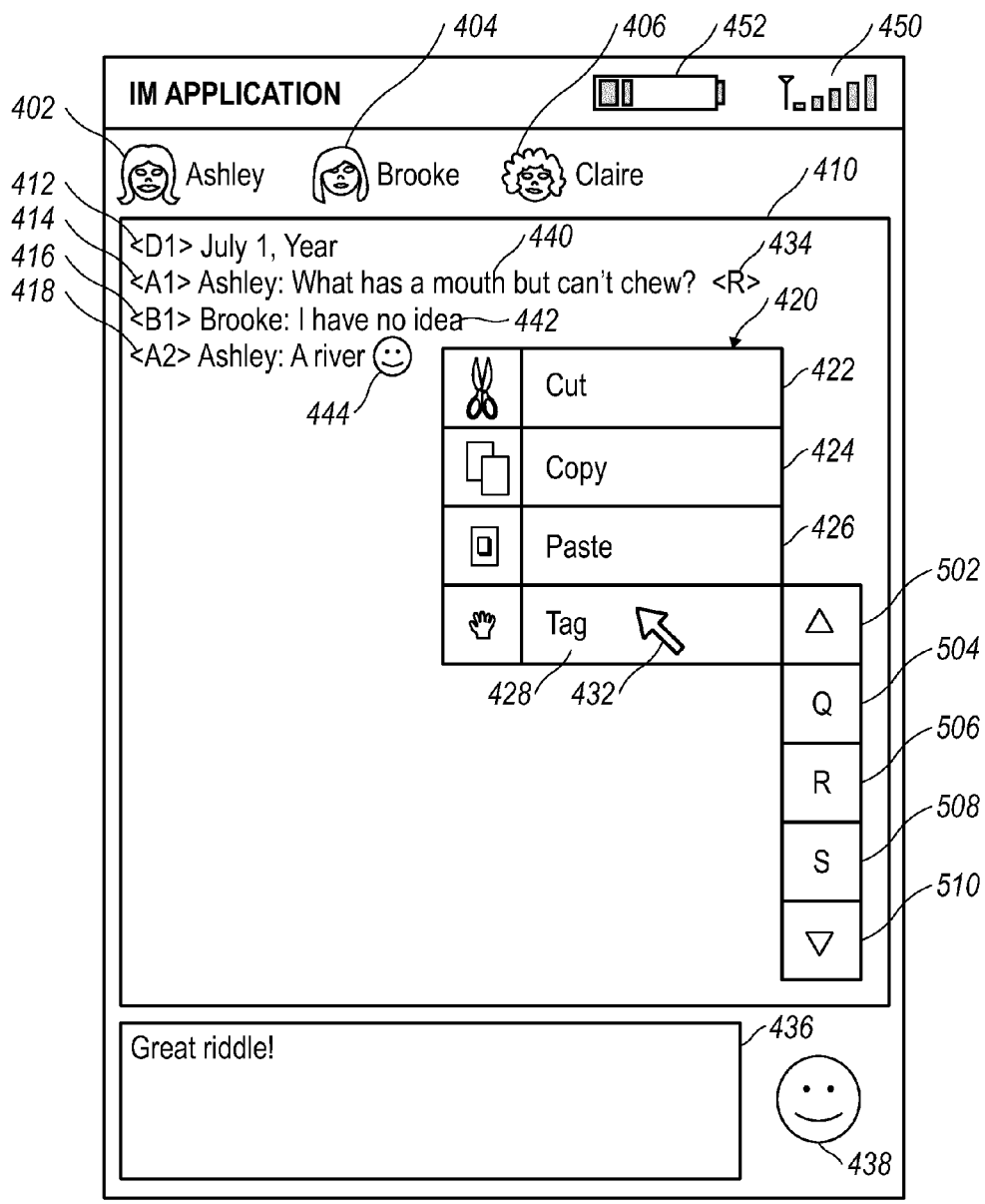
FIG. 5 is a visual representation of the instant messaging application according to another example.
Figure 6:
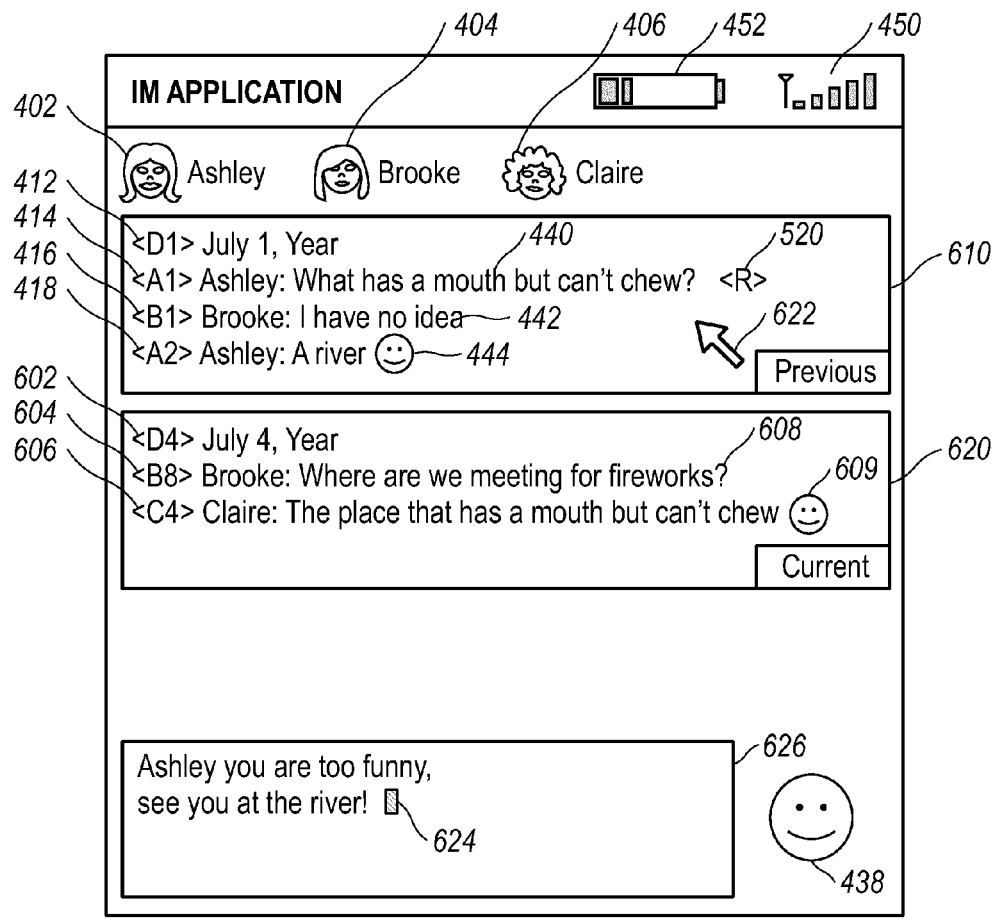
FIG. 6 is a visual representation of the instant messaging application according to yet another example.

FIGS. 4-6 illustrate examples of graphical user interfaces 400, 500, 600 that display a graphical representation of tagged and retrieved instant message content on the mobile communication device 103. Referring to FIG. 4, the GUI 400 may include a listing of participants 402, 404, 406; a session window 410 having session entries 440, 442, 444; a date tag <D1> 412; sender tags <A1> 414 and <A2> 418 corresponding to participant Ashley 402; sender tag <B1> 416 corresponding to participant Brooke 404; a drop down menu 420 that includes a cut icon 422, a copy icon 424, a paste icon 426 and a tag icon 428 with an arrow 430 to provide a list of available tags; a pointer 432; a cursor 434; a reply window 436; a mood icon 438; a signal strength icon 450; and a battery strength icon 452; among other icons.

In FIG. 4, participant Claire 406 prepares a response "Great Riddle!" in the reply window 436 and places the cursor 434 at the end of the session entry 440. Additionally, a pre-defined hotkey is actuated to access the drop down menu 420. The pointer 432 is used to select the tag icon 428 in order to display available hotkeys 504, 506, 508 (shown in FIG. 5). To expedite selection of available hotkeys, the user may directly actuate desired keys on a keyboard rather than manually scrolling through the list of available hotkeys using arrow icons 502 and 510 to indirectly actuate desired keys. FIG. 5 illustrates tag <R> 520 placed at the end of the session entry 440 in the position of cursor 434 in response to selecting character "R" 506 from the list of available tags. As discussed above, rather than accessing drop down menu 420, the user may press and hold the "r" key for predetermined amount of time, such as 2 seconds, with the cursor 434 positioned at the end of the session entry 440. One of ordinary skill in the art will readily appreciate that the GUI of the mobile communication device may be configured differently. Furthermore, a second pre-defined hotkey may be actuated to access a second drop down menu (not shown) to identify available hotkeys or programmed hotkeys along with associated content and the sender of the associated content, among other information.

FIG. 6 illustrates a GUI 600 having a split window that includes a previous session window 610 and a current session window 620. The GUI 600 includes a listing of participants 402, 404, 406; the previous session window 610 having previous session entries 440, 442, 444, the date tag <D1> 412, the sender tags <A1> 414 and <A2> 418 corresponding to participant Ashley 402 and the sender tag <B1> 416 corresponding to participant Brooke 404. The GUI 600 further includes the current session window 620 having current session entries 608 and 609, a date tag <D4> 602, a sender tag <B8> 604 corresponding to participant Brooke 404, a sender tag <C4> 606 corresponding to participant Claire 406; a pointer 622; a cursor 624; a reply window 626; a mood icon 438; a signal strength icon 450; and a battery strength icon 452; among other icons.

In FIG. 6, the participants correspond in the current session window 620. Participant Claire 406 recognizes a reference to riddle content 440 from a previous instant message communication and recalls that she tagged the riddle content 440. In seeking the previously published solution to the riddle, participant Claire 406 presses the "r" key to open the previous session window 610 to display the riddle content located at the previous session entry 440, along with the solution located in the previous session entry 444. Alternatively, participant Claire 406 could have pressed the "d" key to open the previous session window 610 and sequentially scroll through date tags to locate date tag <D1> 412. If desired, participant Claire 406 may prepare a reply for submission through the reply window 626.

According to another example, a user may access a camera application on the mobile communication device 103 to capture digital images. In this case, the marking application 359 may automatically embed data or associate data with the captured digital images, including GPS data, among other data. The marking application 359 may tag the captured digital images for subsequent retrieved through the instant message application on the mobile communication device 103. Additionally, the marking application 359 may alert users if the captured content does not comply with other preferred guidelines, such as a low resolution for digital images, among other deficiencies.

The marking application 359 provides for manual tagging and automatic tagging of instant message content using the mobile communication device 103. The instant message content may be subsequently retrieved and configured for display on the mobile communication device display 222. The number of session entries selected for display may correspond to the resources available on the mobile communication device 103, among other criteria.

Figure 7:
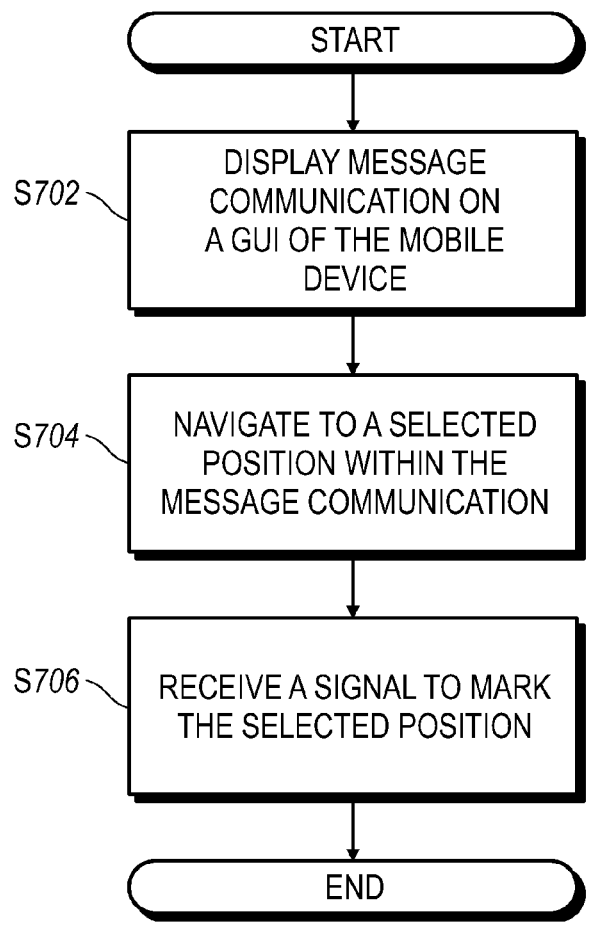
FIG. 7 is a flow chart illustrating a process of marking content in substantially real-time messaging applications on a mobile communication device according to one example.

FIG. 7 illustrates a process diagram for performing a method 700 of marking content in substantially real-time messaging applications according to one example. The marking application 359 in cooperation with the messaging application displays a message communication on a graphical user interface of a mobile communication device in step S702 and enables navigation to a selected position within the message communication in step S704. The marking application 359 further receives a signal to mark the selected position with a tag in step S706.

The method 700 may further include receiving a manually actuated signal to mark the selected position within the message communication and receiving an automatically actuated signal to mark a portion of the message communication based on a pre-defined rule. Receiving the manually actuated signal to mark the selected position within the message communication may include receiving one of: a first actuation signal from a user-selected key on a keyboard of the mobile communication device or a second actuation signal from a user-selected icon on the graphical user interface of the mobile communication device.

The marking application 359 further may associate at least one of: the first actuation signal from the user-selected key with the tag or the second actuation signal from the user-selected icon with the tag and detect selection of the user-selected key or the user-selected icon. Additionally, the marking application 359 may retrieve the selected position associated with the tag and present content on the graphical user interface corresponding to the selected position. The content may be presented on the graphical user interface by generating a split window having a previous session window and a current session window. To enhance navigation efficiency, the marking application 359 associates additional positions and content with the user-selected key and receives a plurality of first actuation signals from the user-selected key. The additional positions and content may be presented in the previous session window.

According to one example, the marking application 359 may be a client application that resides on the mobile communication device 103 and is executable on the microprocessor 338. The marking application 359 may request information corresponding to the user-performed action and the device-performed actions. Accordingly, the client device 103 may process the received data. Alternatively, the disclosure may include a client application that communicates with a remote server application to enable processing the data at the remote server.

The disclosure may be implemented using hardware or software in association with hardware. In some embodiments, the software may include firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the disclosure may take the form of a computer program product that includes program modules accessible from computer-usable or computer-readable medium storing program code for use by or in connection with one or more computers, processors, or instruction execution system. The medium can be an electronic, magnetic, optical, electromagnetic, infrared, or semiconductor system (or apparatus or device) or a propagation medium (though propagation mediums in and of themselves as signal carriers are not included in the definition of physical non-transitory computer-readable medium). Examples of a physical non-transitory computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

What is claimed is:

1. A computer-implemented method of marking content in substantially real-time messaging applications, the method comprising:

displaying a message communication on a graphical user interface of a mobile communication device, the message communication including a plurality of entries, the plurality of entries including one or more characters;

receiving a first signal to navigate a pointer to a selected position within one of the plurality of entries of the message communication;

receiving a second signal to mark the selected position with a tag;

receiving in response to the second signal, an entry identification number corresponding to a selected entry and an index number corresponding to a selected character within the selected entry; and associating the entry identification number and the index number with the tag;

wherein the receiving the second signal to mark the selected position with the tag further comprises:

receiving a manually actuated signal to mark the selected position within the message communication, includes receiving one of: a first actuation signal from a user-selected key on a keyboard of the mobile communication device and a second actuation signal from a user-selected icon on the graphical user interface of the mobile communication device; and receiving an automatically actuated signal to mark a portion of the message communication based on a pre-defined rule.

2. The computer-implemented method of claim 1, further comprising:

associating at least one of: the first actuation signal from the user-selected key and the second actuation signal from the user-selected icon with the tag;

detecting selection of one of the user-selected key and the user-selected icon;

retrieving the selected position associated with the tag; and presenting content on the graphical user interface corresponding to the selected position.

3. The computer-implemented method of claim 2, wherein presenting content on the graphical user interface corresponding to the selected position includes generating a split window having a previous session window and a current session window.

4. The computer-implemented method of claim 3, further comprising:

associating at least one additional position and content with the user-selected key;

receiving a plurality of first actuation signals from the user-selected key; and presenting the at least one additional position and content in the previous session window.

5. The computer-implemented method of claim 2, wherein detecting selection of one of the user-selected key and the user-selected icon further comprises presenting a table on the graphical user interface that displays programmed user-selected keys.

6. A non-transitory computer program product provided on a computer readable medium for marking content in substantially real-time messaging applications, the computer program product comprising instructions which, upon execution by a processor of the mobile communication device, cause the processor to:

display a message communication on a graphical user interface of a mobile communication device, the message communication including a plurality of entries, the plurality of entries including one or more characters;

receive a first signal to navigate a pointer to a selected position within one of the plurality of entries of the message communication;

receive a second signal to mark the selected position with a tag;

receive in response to the second signal, an entry identification number corresponding to a selected entry and an index number corresponding to a selected character within the selected entry; and associate the entry identification number and the index number with the tag;

wherein the receive the second signal to mark the selected position with the tag further comprises:

receive a manually actuated signal to mark the selected position within the message communication, includes receiving one of: a first actuation signal from a user-selected key on a keyboard of the mobile communication device and a second actuation signal from a user-selected icon on the graphical user interface of the mobile communication device; and receive an automatically actuated signal to mark a portion of the message communication based on a pre-defined rule.

7. The non-transitory computer program product of claim 6, wherein the computer program product comprises instructions which, upon execution by the processor, causes the processor to:

associate at least one of: the first actuation signal from the user-selected key and the second actuation signal from the user-selected icon with the tag;

detect selection of one of the user-selected key and the user-selected icon;

retrieve the selected position associated with the tag; and present content on the graphical user interface corresponding to the selected position.

8. The non-transitory computer program product of claim 7, wherein the computer program product comprises instructions which, upon execution by the processor, causes the processor to: present content on the graphical user interface corresponding to the selected position; and generate a split window having a previous session window and a current session window.

9. The non-transitory computer program product of claim 8, wherein the computer program product comprises instructions which, upon execution by the processor, causes the processor to:

associate additional positions and content with the user-selected key;

receive a plurality of first actuation signals from the user-selected key; and present the additional positions and content in the previous session window.

10. The non-transitory computer program product of claim 7, wherein causing the processor to detect selection of the user-selected key or the user-selected icon further comprises presenting a table on the graphical user interface that displays programmed user-selected keys.

11. A mobile communication device for marking content in substantially real-time messaging applications, the mobile communication device comprising:

a processor programmed to:

display a message communication on a graphical user interface of a mobile communication device, the message communication including a plurality of entries, the plurality of entries including one or more characters;

receive a first signal to navigate a pointer to a selected position within one of the plurality of entries of the message communication;

receive a second signal to mark the selected position with a tag;

receive in response to the second signal, an entry identification number corresponding to a selected entry and an index number corresponding to a selected character within the selected entry; and associate the entry identification number and the index number with the tag;

wherein the processor programmed to receive the second signal to mark the selected position with the tag is further programmed:

receive a manually actuated signal to mark the selected position within the message communication, includes receiving one of: a first actuation signal from a user-selected key on a keyboard of the mobile communication device and a second actuation signal from a user-selected icon on the graphical user interface of the mobile communication device; and receive an automatically actuated signal to mark a portion of the message communication based on a predefined rule.

12. The mobile communication device of claim 11, wherein the processor is further programmed to:

associate at least one of: the first actuation signal from the user-selected key and the second actuation signal from the user-selected icon with the tag;

detect selection of one of the user-selected key and the user-selected icon;

retrieve the selected position associated with the tag; and present content on the graphical user interface corresponding to the selected position.

13. The mobile communication device of claim 12, wherein the processor programmed to present content on the graphical user interface corresponding to the selected position is further programmed to generate a split window having a previous session window and a current session window.

14. The mobile communication device of claim 13, wherein the processor is further programmed to:

associate additional positions and content with the user-selected key;

receive a plurality of first actuation signals from the user-selected key; and present the additional positions and content in the previous session window.

* * * * *

UNITED STATES PATENT AND TRADEMARK OFFICE
CERTIFICATE OF CORRECTION

| | | |
|---|---|---|
| PATENT NO. | : 8,965,422 B2 | Page 1 of 1 |
| APPLICATION NO. | : 13/403104 | |
| DATED | : February 24, 2015 | |
| INVENTOR(S) | : Tabarak Khan | |

It is certified that error appears in the above-identified patent and that said Letters Patent is hereby corrected as shown below:

In the Claims

In Column 16, Line 10, In Claim 6, delete "the receive" and insert -- receiving --, therefor.

Signed and Sealed this
Fifteenth Day of September, 2015

Michelle K. Lee
*Director of the United States Patent and Trademark Office*